A. E. DURAM.
VALVE FOR STEAM TRAPS AND THE LIKE.
APPLICATION FILED OCT. 25, 1905.
976,055.
Patented Nov. 15, 1910.
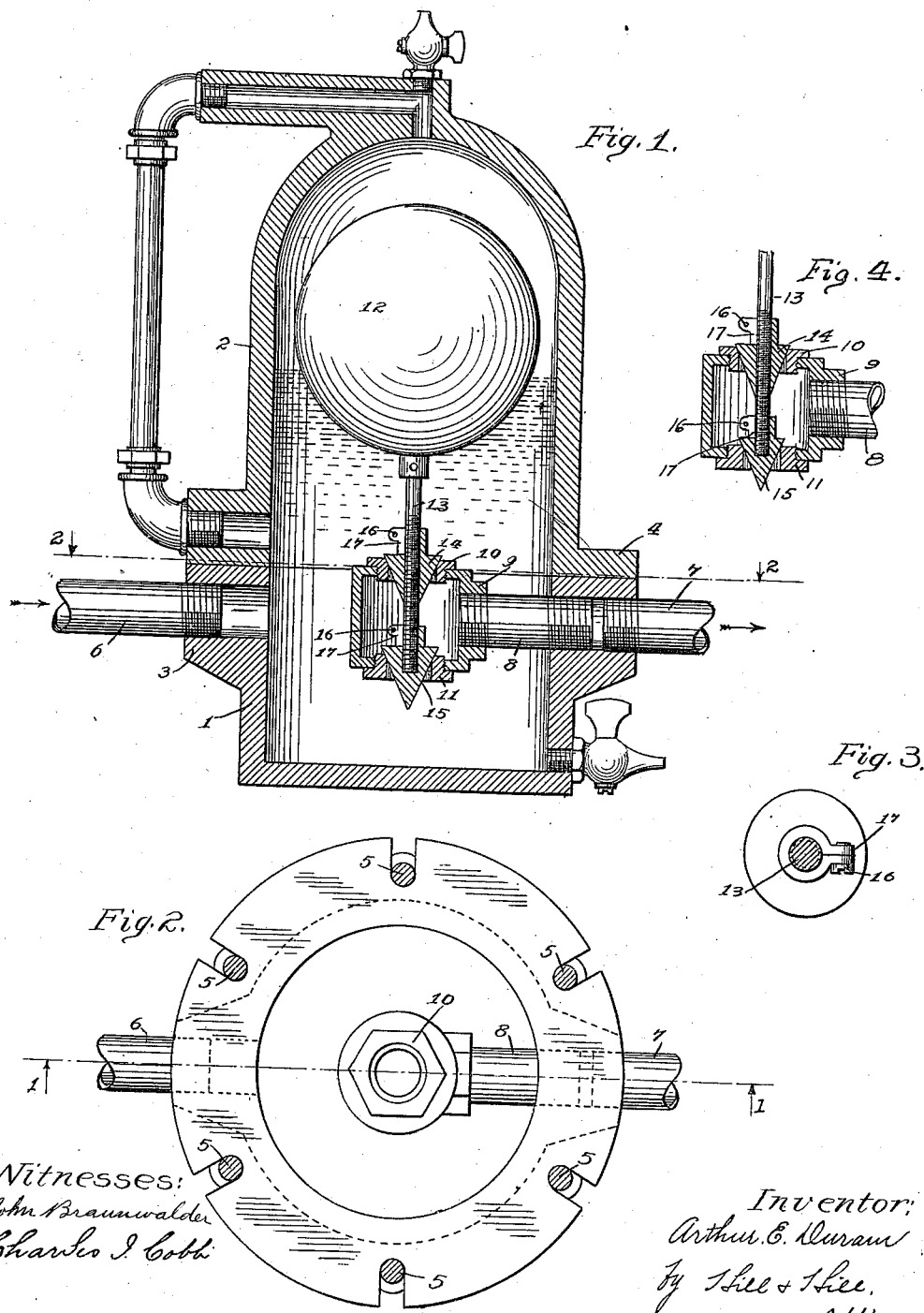

UNITED STATES PATENT OFFICE.

ARTHUR E. DURAM, OF CHICAGO, ILLINOIS.

VALVE FOR STEAM-TRAPS AND THE LIKE.

976,055.　　　　Specification of Letters Patent.　　Patented Nov. 15, 1910.

Application filed October 25, 1905. Serial No. 284,343.

*To all whom it may concern:*

Be it known that I, ARTHUR E. DURAM, a citizen of the United States, residing at Chicago, county of Cook, and State of Illinois, have invented certain new and useful Improvements in Valves for Steam-Traps and the Like, of which the following is a description.

My invention relates to valve mechanism, especially applicable for use in steam traps by which accumulations of water or other liquids, whether arising from the condensation of steam or otherwise, will be discharged, and in the latter use, without the escape of steam.

The object of my improvement is to produce a simple, effective and convenient device for the purpose stated.

To this end my invention consists in the novel construction, arrangement and combination of parts shown and described and more particularly pointed out in the claims.

In the drawings wherein like reference characters indicate like or corresponding parts, Figure 1 is a vertical sectional view of my invention on line 1—1 of Fig. 2. Fig. 2 is a transverse section on line 2—2 of Fig. 1. Fig. 3 is a transverse detail section through the valve stem above one of the valves, and Fig. 4 is a sectional view of the valve chamber and valves showing a slight modification.

In the drawings for the purpose of illustration, my valve mechanism is shown applied to a simple form of steam trap in which, 1 represents a suitable base preferably provided with a dome shaped cap 2, the two being constructed to be suitably secured together to form the complete shell or casing. In the form shown in the drawings, this is accomplished by providing the base 1 with a flange 3 and the cap 2 with a coöperating flange 4 and securing them together with suitable bolts 5 or equivalent means in the usual manner. An inlet 6 and an outlet 7 are provided preferably located in the base 1. By this means the cap 2 may be conveniently removed without the necessity of interfering with the pipe connections. In the preferred construction the outlet is connected by a pipe 8 or equivalent means with a substantially centrally positioned valve chamber 9, provided with valve seats 10 and 11 one or both of which are removable and adjustable in their positions. The valve seats register vertically with one another and are screw-threaded to engage similar screw threaded openings in the chamber.

Within the dome 2 is a float 12, provided with a depending valve stem 13, carrying valves 14 and 15 coöperating with the seats 10 and 11. The valves may be of any preferred form for the purpose. As shown, the valves are each tapered downward affording means for adjustment to the seats to compensate for the wear upon the parts. It is important that the valve seats shall be adjustable in their connection with the valve chamber. I also prefer to make the connection between the valves and the stem in such a manner as to permit of the independent adjustment of the valves thereon. The screw threaded connection between the valve seats and the chamber 9 answers this purpose, and if the threaded portions of the valve seats are made of sufficient length affords all the adjustment required at this point. The stem 13 is also threaded as shown, to receive the threaded valves 14 and 15 and provide for adjusting their position. Suitable means are also provided for preventing the accidental displacement of the valves when they are adjusted.

As shown, each valve is provided with a neck or shank having a longitudinal groove arranged to divide the neck into two parts, each with suitable ears or lugs 17 thereon, provided with clamping bolts 16 for drawing the parts together and securely clamping the stem between them. I prefer to make the opening in the seat 10 slightly larger than the valve 15, so that the latter may readily pass through the seat whereby upon removing the cap the float and valves may be readily removed without interfering with the connection or the adjustment of the parts. The dome and float are so proportioned that the latter is effectually guided in its operation and the accidental displacement of the valves with the valve chamber is prevented, insuring the perfect operation of the device.

As described the valves are substantially balanced and are effectively operated by a float of slight buoyancy regardless of the pressure in the device.

The operation is obvious. The device is compact and very effective in its operation, and exceedingly convenient in handling.

Having thus described my invention, what

I claim as new, and desire to secure by Letters Patent is:—

1. In a device of the kind described, a valve chamber provided with alined openings in its top and bottom, and valve seats adjustably mounted in said openings, in combination with a valve stem associated with said chamber, a valve for each valve seat mounted upon said stem, each independently adjustable thereon and adapted to coöperate with said seats to control communication through said chamber, and means carried by each of said valves arranged to coöperate with said stem to lock the valve in its adjusted position upon said stem.

2. The combination with a valve chamber, of a screw-threaded valve stem associated with said chamber, a valve engaging the threaded portion of said stem and adjustable thereon, said valve coöperating with said chamber to control communication therethrough, said valve also having a split neck surrounding said stem, and means for clamping the split neck of the valve into engagement with the stem to lock the valve in adjusted position upon the stem.

3. The combination with a valve chamber having openings in its top and bottom and arranged in alinement with each other, of valve seats arranged in said openings, a screw-threaded valve stem associated with said chamber, valves arranged upon the threaded portion of said stem and adjustable thereon, said valves coöperating with said seats to control communication through said chamber, said valves also having split necks surrounding said stem, and means for clamping the split necks of the valve into engagement with the stem to lock the valves in adjusted position upon the stem.

4. In a device of the kind described, a valve chamber provided with alined openings in its top and bottom, and valve seats adjustably mounted in said openings, in combination with a screw threaded valve stem associated with said chamber, valves arranged upon the threaded portion of said stem and adjustable thereon, said valves coöperating with said seats to control communication through said chamber, said valves also having split necks surrounding said stem, and means for clamping the split necks of the valves into engagement with the stem to lock the valves in adjusted position upon the stem.

In testimony whereof, I have hereunto signed my name in the presence of two subscribing witnesses.

ARTHUR E. DURAM.

Witnesses:
ROY W. HILL,
CHARLES I. COBB.